United States Patent [19]
Temme et al.

[11] 3,869,039
[45] Mar. 4, 1975

[54] SCRAPER ASSEMBLIES FOR SCRAPER CHAIN CONVEYORS

[75] Inventors: Helmut Temme, Waltrop; Oscar Kohler, Lunen-Sud, both of Germany

[73] Assignee: Gewerkschaft Eisenhutte Westfalia, Wethmar near Lunen, Westfalia, Germany

[22] Filed: May 8, 1973

[21] Appl. No.: 358,230

[30] Foreign Application Priority Data
May 18, 1972 Germany............................ 2224322

[52] U.S. Cl. .............................................. 198/175
[51] Int. Cl. ............................................ B65g 19/00
[58] Field of Search............ 198/175, DIG. 18, 151, 198/176

[56] References Cited
UNITED STATES PATENTS
529,016    11/1894   Bennett............................. 198/176
2,757,784  8/1956    VanStroh et al..................... 198/175
3,653,492  4/1972    Temme............................... 198/175

Primary Examiner—Evon C. Blunk
Assistant Examiner—Douglas D. Watts
Attorney, Agent, or Firm—Sughrue, Rothwell, Mion, Zinn & Macpeak

[57] ABSTRACT

A scraper assembly for use with double-chain scraper conveyors and composed of a one-piece scraper and a one-piece locking bar. The scraper and locking bar each have a main body with shaped end portions provided with complementary grooves which receive horizontal links of the chains. The end portions of the scraper have depending spigots which engage in these horizontal links and apertures which locate the adjoining vertical links of the chains. The scraper and locking bar have interengaging projections and recesses and are secured together with the aid of bolts and/or screws.

7 Claims, 6 Drawing Figures

SCRAPER ASSEMBLIES FOR SCRAPER CHAIN CONVEYORS

BACKGROUND TO THE INVENTION

The present invention relates generally to scraper chain conveyors used in mineral mining installations and more particularly to a scraper assembly usable with such conveyors.

Various forms of scraper-chain assemblies are known in the art. with conveyors provided with two chains circulated along the sides of the channel sections of the conveyor it is well known to connect the scrapers to the chains with the aid of connectors resembling the oval links of the chains. These connectors are provided at intervals along the lengths of the chains and interconnect vertical links of the chains so that each connector thus joins short sections of the chains together. The connectors are then secured to the scrapers with the aid of bolts.

In another assembly the chains are continuous, i.e., not interrupted by the connectors mentioned above, and locking members clamp horizontal links of the chains to the scrapers so that each scraper is provided with two locking members.

In the case of the conveyors provided with a single chain circulated along the centre of the channel sections of the conveyor it is known to use similar locking members to clamp horizontal links of the chain to the scrapers. The invention is concerned with double-chain conveyors and a general object of the invention is to provide an improved assembly which can be utilized with continuous chains.

SUMMARY OF THE INVENTION

According to the invention there is provided a scraper assembly for use with scraper chain conveyors; said assembly being composed of a first one-piece component which is securable to a second one-piece component, the components each having a main body and end portions, the end portions of the components being shaped in a complementary manner to receive and engage the oval links of chains so as to lock said links to the assembly.

In a preferred construction the end portions of the components have facing grooves which serve to receive and locate horizontal links of the chains, the grooves in the end portions of one of the components, which extend over the links of the chains, being curvilinear in plan view and the grooves in the end portions of the other of the components which extend beneath the links being rectilinear in plan view.

The end portions of one of the components is also advantageously provided with spigots which project into the horizontal links of the chains.

It is desirable for one of the components, usually the component which extends over the chain links to have apertures in its end portion which locate the vertical links of the chains adjoining the horizontal links retained in the grooves. This upper component would form the scraper whilst the other component would form a locking bar. Preferably the main bodies and end poriions of the scraper and locking bar have interengageable projections and recesses which serve to positively locate the components on one another, during assembly and to inhibit relative movement between the components.

The main bodies of the scraper and locking bar may have bores therein which receive horizontal bolts used to secure these components together. The aforesaid spigots may also have vertical bores for receiving screws which engage in threaded bores in the end portions of the locking bar located between the grooves thereof.

The locking bar preferably forms the main part of the conveying surface of the assembly and has an undersurface projecting below the undersurface of the scraper to slide along the channel sections of the conveyor. The scraper may then have a main body with a vertical web and a widened head piece having a curved face which overlaps the locking bar.

The external ends of the scrapper may have reinforcement beads which guide the assembly along the channel sections of the conveyor. The assembly enables a rigid connection to be established with the continuous chains whilst permitting a certain degree of movement to the chain links engaged thereby. The assembly can however be readily disengaged from the chains when desired.

The invention may be understood more readily and various other features of the invention may become more apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
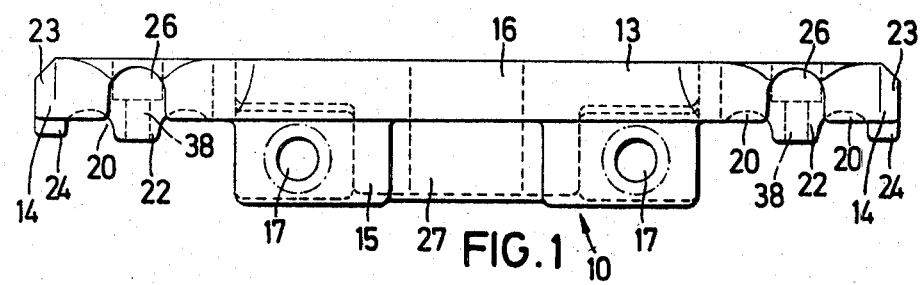
FIG. 1 is a front elevation of a first component of a scraper assembly made in accordance with the invention, the view being taken in a direction opposite to the conveying direction.

The assembly depicted in the drawings is composed of a first one-piece component; namely a scraper 10, and a second one-piece component, namely a locking bar 11, which is securable to the scraper 10 with the aid of bolts 12 and screws 40.

Figure 2:
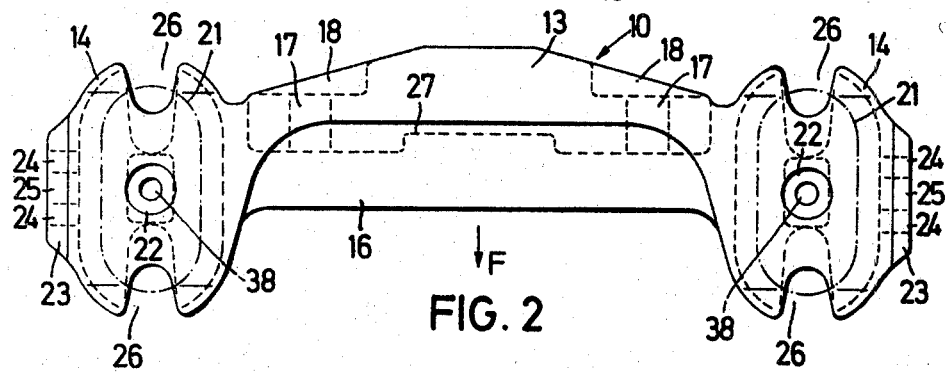
FIG. 2 is a plan view of the component shown in FIG. 1.

Referring initially to FIGS. 1 and 2, the scraper 10 is of integral construction with a main body 13 with shaped portions 14 at its ends. As shown more clearly in FIG. 6, the body 13 has a somewhat L-shaped cross-section with an upstanding web 15 adjoining a widened head piece 16, which has a rounded fromt face. The web 15 of the body 13 has horizontal bores 17 therein adjacent the end portions 14 which serve to receive the connecting bolts 12. The rear face of the body 13 has recesses 18 therein which accommodate nuts 19 which engage in the bolts 12. The front side of the body 13 has a central recess 27 defined at the top by the headpiece 16 and at the sides by the material surrounding the bores 17. The end portions 14 are shaped to conform with the oval links of the chains with which the assembly is associated. These links are denoted generally by the centre line 21 in FIG. 2. On the undersurface of each portion 14 there are provided grooves 20 having a longitudinal and transverse profile adapted to conform with the horizontal links of the chains. The depth of the grooves 20 is somewhat smaller than half the thickness of the chain links. Between the grooves 20 of each end portions 14 there is a spigot 22 of rectangular cross-section which locates within the horizontal link seated in the grooves 20. These spigots 22 are provided with vertical bores which receive the screws 40, the heads of which may be accommodated in recesses at the upper side of the portions 14. The portions 14 have reinforcements in the form of beads 23 at their external ends. Each bead 23 has two vertical projections 24 fo rectangular cross-section on its undersurface separated by a gap or recess 25 of similar profile. The front and rear faces of the portions 14 have cut-outs or apertures 26 of generally U-shaped profile which terminate the grooves 20. These apertures 26 accommodate the vertical links of the chains which engage with the horizontal links seated in the grooves 20. The apertures 26 permit the vertical links to move to a limited extent.

Figure 3:
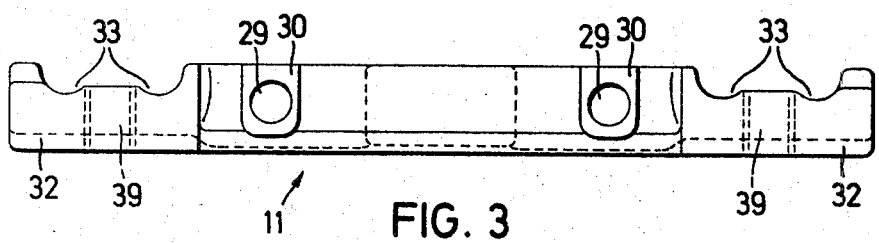
FIG. 3 is a front elevation of a second component of the assembly, the view corresponding to FIG. 1.
Figure 4:
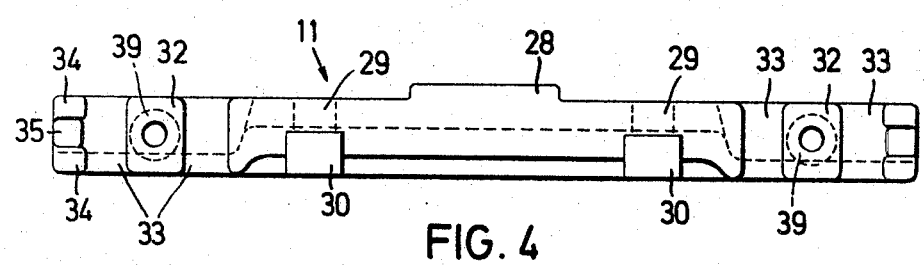
FIG. 4 is a plan view of the component shown in FIG. 3.

Referring now to FIGS. 3 and 4, the locking bar 11 is also of integral construction and has a main body at the rear side of which is a projection 28 adapted to locate in the recess 27 of the scraper 10. The main body of the bar 11 has bores 29 which align with the bores 17 in the scraper 10 to receive the bolts 12. These bores 29 open into recesses 30 at the front side of the main body which serve to accommodate the heads of the bolts 12. The main body of the locking bar also adjoins end portions 32 shaped to confrom with the horizontal chain links in co-operation with the end portions 14 of the scraper 10. Thus, each end portion 32 has rectilinear grooves 33 therein which mate with the curvilinear grooves 20 and receive part of the side limbs of the horizontal chain link. The grooves 33 of each end portion 32 are separated by a slightly raised block which is provided with a screw-threaded bore which serves to receive the vertical screws 40. The external end zones of the portions 32 have recesses 34 of rectangular cross-section on their upper sides which are separated by a projection 35 also of rectangular cross-section. These projections 35 and recesses 34 are arranged and shaped to mate with the complementary projections 24 and the recess 25 on the end portions 14 of the scraper 10.

Figure 5:
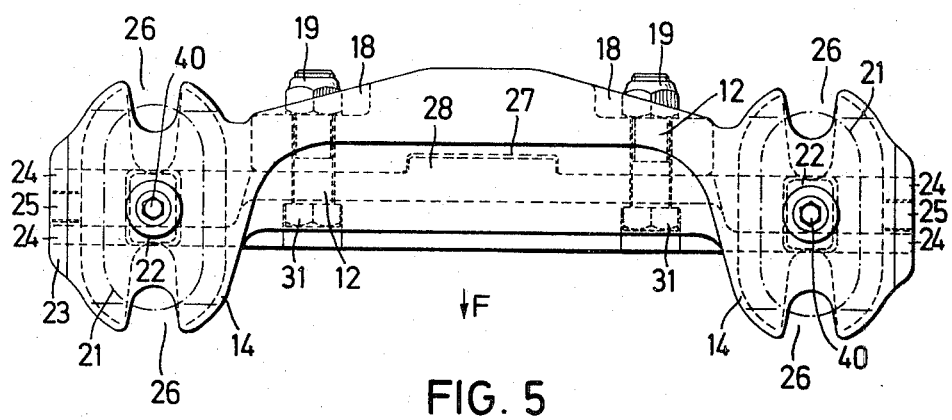
FIG. 5 is a plan view of the complete assembly composed of the components of FIGS. 1-4.
Figure 6:
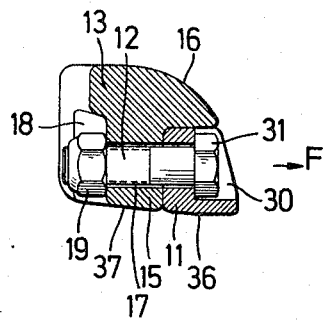
FIG. 6 is a cross-section view of the assembly.

FIGS. 5 and 6 depict the assembly with the components 10, 11 connected together with the aid of the nuts 19 and bolts 12 and the screws 40. As discussed, the parallel chains have two of their horizontal links engaged with the grooves 20, 33 of the end portions 14, 32 of the components 10, 11. Normally the locking bar 11 would be positioned beneath the selected horizontal links so that they lie in the grooves 33. The scraper 10 would then be positioned onto the horizontal links so that the projection 28 engages in the recess 27, the projections 24, 35 engage in the recesses 34, 25 respectively, and the depending spigots 22 locate the links.

The scraper 10 would then be secured to the bar 11 with the aid of the screws 40 and the nuts and bolts 12, 19. The horizontal links of the chain are trapped in the grooves 20, 33 and thereby locked to the assembly with a certain degree of movement about the spigots 22. Also, the adjoining vertical links are positively located by the apertures 26 with the desired degree of play. The interengagement of the projections 28, 24, 35 and the recesses 27, 34, 25 serve to positively lock the components 10, 11 together. The assembly can be readily disengaged from the chains by removing the bolts 12 and the screws 40.

During use, the bar 11 forms a continuation of the rounded face of the head 16 and engages the material to be conveyed along the channel sections of a conveyor. The conveying direction is denoted F in FIG. 6. As shown in FIG. 6, the undersurface 36 of the bar 11 projects somewhat below the undersurface of the scrapper so that the bar 11 slides along the channel sections. From time to time the bar 11 can be replaced when undue wear has occured.

We claim:

1. A scraper assembly for use with scraper chain conveyors; said assembly consisting of a first one-piece component provided with a main body and shaped end portions and a second one piece component provided with a main body and end portions; the end portions of the first component each having grooves, which are curvilinear in plan view, on its undersurface for locating over an oval horizontal link of one of two spaced-apart chains, a depending spigot disposed between the grooves which projects into said horizontal link and vertical apertures at its front and rear sides which locate vertical links of the chain adjoining said horizontal link, the main body of the first component having an upstanding web and a widened head piece which projects over the main body of the second component and the end portions of the second component each having grooves, which are rectilinear in plan view, on its upper surface for locating under one of said horizontal links, the end portions of the first and second components being provided with a plurality of interengageable projections and recesses and the main bodies of the components having a centrally located interengageable projections and recesses and bores for receiving fixing means for securing the components together.

2. An assembly according to claim 1 wherein the fixing means is in the form of bolts which extend substantially parallel to the length of the chains when the assembly is in use.

3. An assembly according to claim 2, wherein the bores in the main bodies of the components are alignable to receive said bolts and said recesses receive the heads of the bolts and nuts engageable with the bolts.

4. An assembly according to claim 2, wherein the bolts are supplemented by screws which extend substantially perpendicular to the length of the chains.

5. An assembly according to claim 1 wherein the fixing means is in the form of bolts which extend substantially parallel to the length of the chains when the assembly is in use and wherein the spigots have bores therein for receiving screws engageable in threaded bores located between the grooves in the end portions of the other of the components.

6. An assembly according to claim 1, wherein the external ends of the end portions of at least one of the components have reinforcement beads.

7. An assembly according to claim 1, wherein the second component forms the main part of the conveying surface and has an undersurface which projects below the undersurface of the other component.

* * * * *